(12) United States Patent
Sunamori et al.

(10) Patent No.: US 7,361,700 B2
(45) Date of Patent: Apr. 22, 2008

(54) METHOD FOR PRODUCING COLORANT EXCELLENT IN COLOR DEVELOPMENT

(75) Inventors: Takashi Sunamori, Funabashi (JP); Fumiyuki Kadowaki, Misato (JP); Koichi Noguchi, Tokyo (JP); Hideto Uchida, Narashino (JP); Kazuki Torinoumi, Funabashi (JP)

(73) Assignee: Taisei Chemical Industries, Ltd., Tokyo (JP)

( * ) Notice: Subject to any disclaimer, the term of this patent is extended or adjusted under 35 U.S.C. 154(b) by 453 days.

(21) Appl. No.: 10/733,466

(22) Filed: Dec. 12, 2003

(65) Prior Publication Data

US 2004/0204514 A1    Oct. 14, 2004

(30) Foreign Application Priority Data

Apr. 10, 2003   (JP)   ............... 2003-106445

(51) Int. Cl.
- *B01F 3/08* (2006.01)
- *C08F 6/16* (2006.01)
- *C08J 3/00* (2006.01)
- *C08K 3/20* (2006.01)
- *C08L 31/00* (2006.01)

(52) U.S. Cl. ............ 523/310; 523/322; 524/556; 524/558

(58) Field of Classification Search ............ 523/310, 523/322; 524/556, 558
See application file for complete search history.

(56) References Cited

U.S. PATENT DOCUMENTS

| | | | |
|---|---|---|---|
| 3,418,295 A | 12/1968 | Schnenthaler | |
| 3,671,412 A | 6/1972 | Lobr | |
| 4,802,989 A | 2/1989 | Haruta et al. | |

FOREIGN PATENT DOCUMENTS

| | | |
|---|---|---|
| DE | 40 25 558 | 2/1992 |
| EP | 899 288 | 3/1999 |
| EP | 0 893 821 | 4/2000 |
| FR | 2 549 844 | 2/1985 |
| GB | 1 381 298 | 1/1975 |
| JP | 7316242 | 12/1995 |
| JP | 10298294 | 11/1998 |
| JP | 11071468 | 3/1999 |
| JP | 2000 086706 | 3/2000 |
| JP | 2000086706 | 3/2000 |
| JP | 2000119141 | 4/2000 |
| JP | 2000119571 | 4/2000 |
| JP | 2000026560 | 1/2001 |

*Primary Examiner*—Patrick Niland
(74) *Attorney, Agent, or Firm*—Manelli Denison & Selter PLLC; Paul E. White

(57) ABSTRACT

There is provided a method for producing colorants which can exhibit excellent color development even in a small amount and are low in thixotropy.

The constituent feature of the present invention comprises:
  enhancing the molecular extinction coefficient of the coloring matter substance by ion exchanging method, to afford a room for increasing B (resin) of P/B;
  then a composition is designed and employed to enhance the effect increasing the polar group concentration which is a role of resin and the quality of the effect;
  it thus becomes possible to achieve the limit value of the molecular extinction coefficient as much as possible and to eliminate the factors adversely affecting the present process.

3 Claims, 4 Drawing Sheets

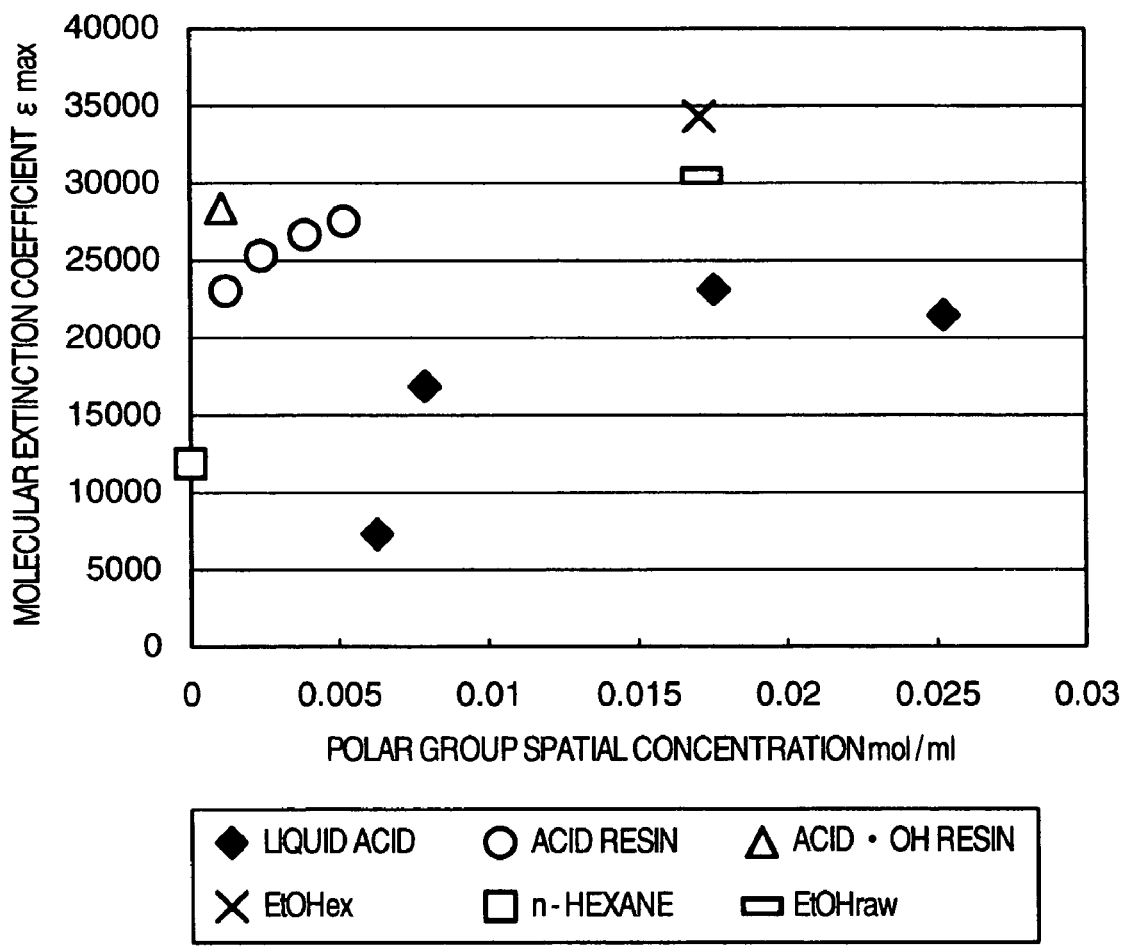

METHOD FOR PRODUCING COLORANT EXCELLENT IN COLOR DEVELOPMENT

BACKGROUND OF THE INVENTION (1) Field of the Invention

The present invention relates to a colorant used for the coloration of materials in the fields of paints, inks, plastics or coating materials used for the parts of IT equipment which utilizes light. More particularly, it relates to a method for producing a colorant excellent in color development by making the most of the inherent absorption spectrum of a coloring matter substance constituting the colorant.

(2) Description of the Related Art

The colored materials used in the above technical fields are generally produced either by a method of directly dispersing a coloring matter substance, such as a pigment or a dye, in a material mainly consisting of a resin, i.e. a binder, suitable for the purpose of use or by a method of previously preparing as above a colorant containing the coloring matter substance at high concentration and incorporating this colorant into a material mainly consisting of a resin, i.e. a binder suitable for the purpose of use.

Therefore, with a rapid advance of the purpose of use in the above fields, needs for the improvement in the quality of colored materials naturally lead to the requirement to develop a technically more advanced method for producing colorant than the above two methods.

It is widely acknowledged that for meeting the above requirement, there have been made efforts to develop a starting material for the coloring matter substance that can provide materials satisfying required delicate color tone and color intensity, and to develop a process for surface treatment of a coloring matter substance, a process for preparing a composite of coloring matter substances, a process for pulverization of a coloring matter substance, etc.

Furthermore, regarding a resin for binder which is another material controling the performance of the materials colored with a coloring matter substance, efforts have been made to develop a resin with less impurities which does not inhibit the performance of the coloring matter substance, i.e. a filler to be introduced (JP-A-2000-086706), and there has been proposed an ampholite resin to be used as a dispersing resin suitable for the dispersion of a coloring matter substance (JP-A-2000-026560).

Further, as to the above two methods for obtaining materials colored with these coloring matter substances, the following methods have been developed and put to practical use: a method which comprises removing impurities in a coloring matter substance by an ion exchange, followed by dispersing the coloring matter substance (JP-A-11-071468), a method which comprises enclosing a coloring matter substance with a resin to form micro-capsules (JP-A-10-298294, JP-A-2000-119141 and JP-A-7-316242), and a method of dispersing fine particles utilizing a dispersing machine (JP-A-2000-119571).

SUMMARY OF THE INVENTION

However, an effort in terms of utilizing the characteristics of a commercially available coloring matter substance seems not to have been made to develop a method for obtaining high color development with a small amount of the coloring matter substance by enhancing the inherent color intensity of the coloring matter substance. Thus, this was a problem yet to be solved.

The inventors have paid regard to the coloring matter substances, which have been already developed and commercially available, and have conducted intensive work on the possibility to develop a method for obtaining high color development with a small amount of the coloring matter substance by enhancing the inherent color intensity of the coloring matter substance. As a result, the present invention has been accomplished.

The inventors have conducted research on the methods to achieve the above object, from the following four technical viewpoints.

First, it is known that a coloring matter substance aggregates around an impurity electrolyte as a nucleus, and when this is subjected to an ion exchange, the aggregates are broken down to show the inherent particle diameter distribution of the coloring matter substance (JP-A-11-071468). The inventors have conducted an investigation on whether any change occurs or not in molecular extinction coefficient in the near ultraviolet region and the visible light region when the aggregates are broken down to discrete particles. As a result, the inventors have found that when the aggregates of the coloring matter substance are broken down into discrete particles by ion exchanging, the molecular extinction coefficient in the near ultraviolet region and the visible light region shows a shift of the maximum absorption wavelength, as compared with the spectrum in these regions of the state where the aggregates are present which is not subjected to an ion exchange. The value of the molecular extinction coefficient was thus found to be increased by the ion exchange. That is, the inventors have found an effective method for saving the amount of the coloring matter substance to be used.

Secondly, since the binder resin in which the coloring matter substance is dispersed is usually prepared by radical solution polymerization, a polymerization inhibitor is added to a monomer, a polymeric component, upon polymerization. Therefore, even after the completion of the polymerization, there usually remains a reaction product of the polymerization inhibitor and a reaction product of an initiator which initiates the polymerization reaction. Furthermore, the monomer, a polymeric component, per se also remains unless the polymerization reaction is 100 percent completed. If the resulting polymer is used as it is, (A) the binder resin per se will be colored when the dispersion is used with heating, resulting in overlapping of the color of the binder with the inherent molecular extinction coefficient of the coloring matter substance to cause the deterioration of color tone; and (B) if the polymeric component is an acidic monomer, the aggregation of the coloring matter substance is accelerated.

These are causes for the deterioration of the inherent color development of the coloring matter substance. Therefore, it is assumed that these impurities should be removed.

The inventors have studied on the possibility of using the ion exchanging method for eliminating the above causes. As a result, it was found that unless a binder resin produced by a usual process is subjected to an ion exchange, the resin cannot be used as a material to be exposed to high-temperature history in the production of a colorant excellent in color development. That is, it was found important to highly purify a binder resin by ion-exchange method, if it is to be used for a colorant excellent in color development.

Thirdly, it is a well-known phenomenon that for the molecular extinction coefficient (absorption spectrum) of the coloring matter substance in the near ultraviolet region and the visible light region, the absorption maximum wavelength and the absorption intensity change, depending on the environment in which the coloring matter substance is placed (solvent effect). The inventors have conducted investigations on what influence the above phenomenon has on preparing a coloring matter substance and a binder resin to be used to achieve the object of the present invention. As a result, it was found that the molecular extinction coefficients (absorption spectrum) of the coloring matter substance in the near ultraviolet region and the visible light region changed, depending on the chemical characteristics of the spatial atmosphere in which the coloring matter substance was present, irrespective of the chemical structure of the coloring matter substance itself. It was found that the molecular extinction coefficient simply increases in proportion to the number of moles of polar groups, such as OH group and COOH group, in a unit volume, whether in liquid or solid, such as resin. It was also found that the extent of the change in molecular extinction coefficient is greater in solid, a resin, than in liquid.

Fourthly, the inventors have made investigations on what conditions would be required when a colorant showing excellent color development with a small amount of a coloring matter substance, obtained according to the present invention, i.e. by devising the method of using a known coloring matter substance, is actually used. The inventors further investigated on what approaches can be taken to meet such requirements., As a result, 1) The inventors investigated whether the impurities externally introduced in the course of the process exert influences or not, even when the raw materials themselves are previously purified. The inventors further investigated the extent of such influences and what measures to be taken for the influences.

This problem is very important, and, in fact, it has been ascertained that even a colorant obtained by dispersing a purified coloring matter substance in a purified binder resin or resin solution high in the polar group concentration, the dispersion, as it is, readily becomes thixotropic and, thus, is difficult to use. This seems to be attributed to that a weakly aggregated structure is apt to be formed due to impurity electrolytes introduced externally. The inventors found that this problem could be solved by further introducing an ion exchanging step as a final step.

2) A colorant having a high molecular extinction coefficient is obtained by combining a purified coloring matter substance with a purified binder resin, and consequentially this colorant can be used for forming thin films. However, in the application of forming thin films, the defects of coating films cannot be covered with a large film thickness as in the case of using conventional coating materials. Hence, sharp particle diameter distribution and high planar uniformity of fluidity which controls the leveling of films to be formed are required, and, as a result, high purity is required. The inventors found that the above conditions could be met by introducing a step of separating coarse particles and, optionally, a step of ion exchanging as a final step.

3) Moreover, it is known that when the colorant is required to have electrical insulation properties, with decrease of film thickness, the uniformity of volume resistivity of the film is lost due to the impurity electrolytes contained in the coating material to be formed into a film (Sunamori and Kimura, "Technology of Coating", Vol. 11, 4-11, (1976)). As a measure to tackle this problem, the inventors have thought of introducing a step of removing the impurity electrolytes by an ion exchange as a final step and as an essential step.

That is, the first embodiment of the present invention relates to a method for producing a colorant comprising:

contacting a dispersion of a powdery coloring matter substance in deionized water with an anion exchange resin and/or a cation exchange resin to carry out ion exchanging of the dispersion until an electrical conductivity of the dispersion reaches 25 µS/cm or lower, thereby obtaining a purified coloring matter substance;

contacting with an anion exchange resin and/or a cation exchange resin an aqueous solution or organic solvent solution of a binder resin prepared so that a carboxyl group concentration or a sum of a carboxyl group concentration and a hydroxyl group concentration is 0.001 mol/ml or higher, to obtain a purified binder resin solution;

kneading the purified coloring matter substance and the purified binder resin solution to obtain a colorant precursor; and contacting the colorant precursor with an anion exchange resin and/or a cation exchange resin.

Furthermore, the present invention relates to a colorant obtainable by the above method or the like.

BRIEF DESCRIPTION OF DRAWINGS

FIG. 4 is a graph which shows dependency of molecular extinction coefficient of a coloring matter substance on atmosphere (i.e. the spatial concentration of polar group (mol/ml) in a polymer and a coloring matter substance) shown in Table 4.

PREFERRED EMBODIMENTS OF THE INVENTION

Figure 1:
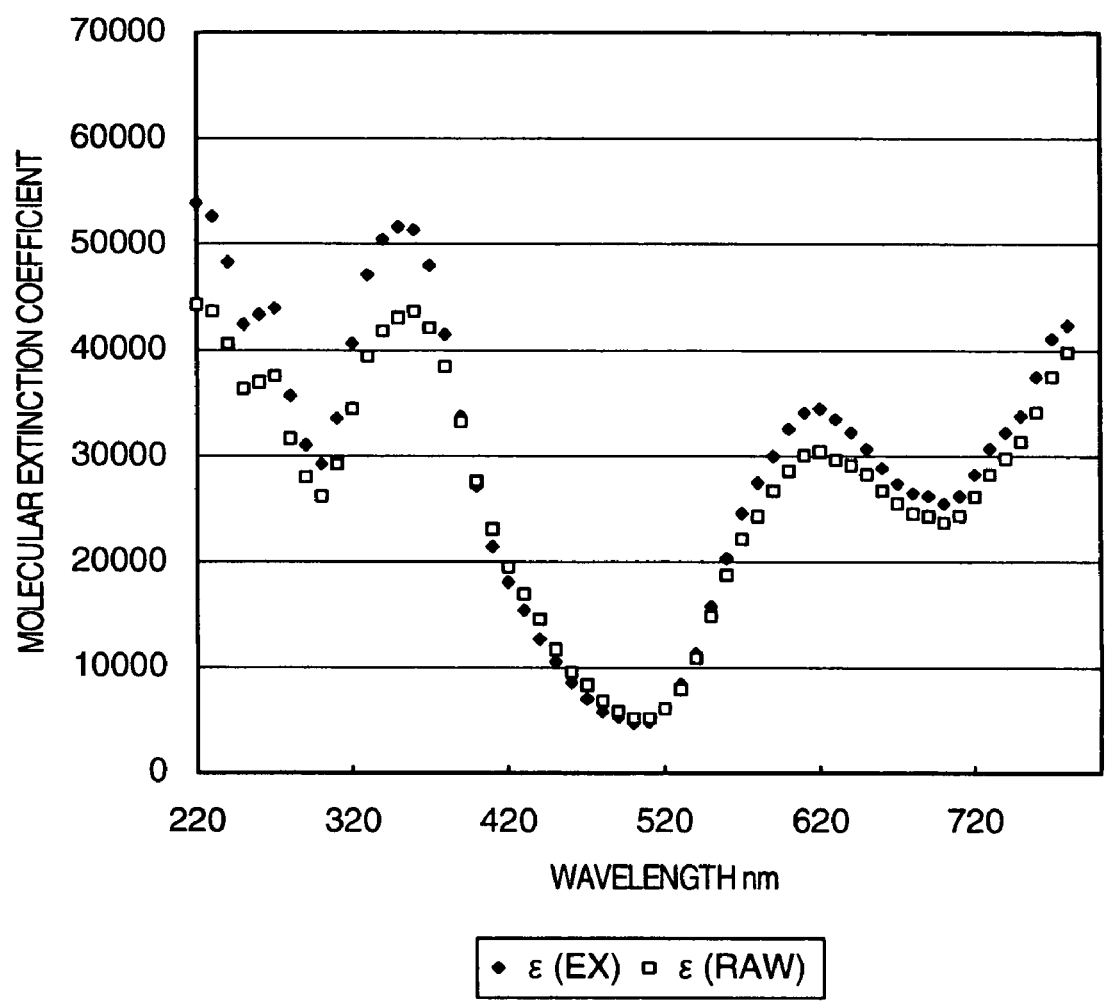
FIG. 1 shows the results of spectrum measurement of a dispersion of copper phthalocyanine blue pigment L6700F before purification ($\epsilon$(RAW)) and after purification ($\epsilon$(EX))

The embodiments of the present invention will be explained in more detail below.

In a method according to the present invention for producing a colorant containing a coloring matter substance purified by forcedly removing electrolyte impurities therefrom and a binder resin similarly purified by forcedly removing electrolyte impurities therefrom, firstly the step of obtaining the coloring matter substance purified by forcedly removing electrolyte impurities therefrom (a purified coloring matter substance) will be described. This step may include three stages.

At the first stage, a powdery coloring matter substance is dispersed in deionized water. This is for preparing an aqueous dispersion of a solid coloring matter substance in order to remove the impurity electrolytes in the coloring matter substance by ion exchange.

Even if the powdery coloring matter substance is hydrophilic, it can be hardly wetted probably due to an air phase present on the surface, and, hence, a particular care must be taken to prepare an aqueous dispersion. This is similar to the method of dispersing wheat flour in water. Irrespective of the powdery coloring matter substance being hydrophilic or hydrophobic, when a powdery solid coloring matter substance is kneaded while adding deionized water little by little, the deionized water in an amount of 0.8-1.2 weight per 1 weight of the coloring matter substance is necessary for making the coloring matter substance to a state of dough (dough formation). Further, for making the coloring matter substance to a fluid state, the deionized water in an amount of about 1.5-2.0 weights in total is required. After fluidization, the coloring matter substance can be diluted with a large amount of deionized water into a slurry.

Therefore, if this process is faithfully carried out, a slurry dispersions of most powdery solid coloring matter substances can be obtained using only deionized water.

Hitherto, there has been a tendency of using organic solvents soluble in water, such as alcohol in the preparation of the coloring matter substance. Although the coloring matter substance can be fluidized with a smaller amount of a solvent than with water, the resultant coloring matter substance tends to form large particles embracing impurity electrolytes when a solvent is used. This would undesirably reduce the efficiency of the ion exchanging conducted at the second step.

In order to eliminate the impurity electrolytes present as nuclei of the aggregates of the solid coloring matter substance, it is preferable to add a small amount of an acid or a base, such as acetic acid or aqueous ammonia, which can be removed at the second stage. In this case, it is advisable to add the acid or base in an amount of about 0.005-0.02 in weight with respect to 1 in weight of the coloring matter substance.

Among the processes of dough formation, fluidization, dilution and slurrying in this stage, the dough formation and fluidization are important. In these processes, attention should be paid to the rate at which deionized water is added. The standard is, for example, 0.1-0.25/min with respect to 1 weight of the coloring matter substance, and particularly a rate of addition of 0.1/min for the dough formation and 0.25/min for fluidization are preferred. Regardless of the scale of the process, the addition can be completed within about 30 minutes.

The deionized water usable in this step preferably has an electric conductivity of 1 µS/cm or less, but the deionized water with 5 µS/cm is sufficient.

The device used for the dough formation or fluidization is preferably a Henschel mixer which is used at about 300 rpm, but other similar devices may be used. For example, a dough kneader of planetary motion type, a ribbon agitator, a kneader for paint, etc. can also be used.

In the dilution and stirring process, there may be used a centrifugal pump of 15-20 m in lift which has a discharging rate depending on the scale of the process. As a standard, it is preferred to use a centrifugal pump which can provide a circulation rate of 3-5 turns per hour, and preferably this is also used in the second stage.

The concentration of the dispersion obtained by dilution is very important, and is preferably as low as possible in order to eliminate the impurity electrolytes of aggregation nuclei. A concentration of 2-5% by weight is preferred from the point of handling, though 5% by weight or higher may be used. In the case where the concentration is higher than 5% by weight, the viscosity of the dispersion increases due to the interaction among the dispersion particles. The concentration higher than 5% by weight, therefore, should be avoided in the systems other than that having low viscosity.

The coloring matter substance used in the present invention is any coloring matter substance as long as it is not soluble in water, irrespective of whether it is organic or inorganic substance and, furthermore, irrespective of whether it is dye or pigment. Typical examples of the coloring matter substances include inorganic pigments such as titanium dioxide, transparent red iron oxide, red iron oxide, prussian blue, ultramarine, cobalt blue, barium sulfate, silica, mica, graphite, iron black and carbon black which have coloring function and are used for paints, inks, toners for color copying, color filters, etc. or composite pigments of these inorganic pigments; organic pigments such as monoazo red, quinacridone red, monoazo red Mn salt, monoazo Bordeaux Mn salt, monoazo maroon Mn salt, anthanthrone red, anthraquinonyl red, perylene maroon, quinacridone magenta, perylene red, diketopyrrolopyrrole, benzimidazolone orange, quinacridone gold, monoazo yellow, cis-azo yellow, isoindolinone yellow, metal complex azo yellow, quinophthalone yellow, benzimidazolone yellow, copper phthalocyanine green, brominated phthalocyanine green, copper phthalocyanine blue, indanthrene blue, dioxane violet, Fast Yellow group, Permanent Yellow HR, acetoanilide type monoazo yellow, Lake Red 4R, Permanent Carmine FB, Brilliant Fast Scarlet, Pyrazolone Red FB, Watchung Red metal salts, lithol red Ba salts, Brilliant Carmine 6B, Bordeaux 10B, Rhodamine 6G Lake, condensed azo red, and Naphthol AS Red; fluorescent pigments having water resistance; and the like.

Furthermore, there may also be used coloring matter substances hardly soluble in water, such as those used for cosmetics, inks, etc. In addition, there may also be used functional coloring matter substances such as coloring matter substances having near infrared absorbability, electrochromic coloring matter substances, photochromic coloring matter substances, dichromatic coloring matter substances for polarized films, thermochromic coloring matter substances, and piezochromic coloring matter substances. Moreover, ultraviolet absorbers having absorbability for ultraviolet rays, etc. may also be used.

Next, the second stage will be explained. This stage is a stage in which the impurity electrolyte discharged into the dispersion in accordance with chemical equilibrium in the above dilution and dispersion stage, namely, the impurity electrolyte which was nuclei of the aggregates of the coloring matter substance, is removed by subjecting the aqueous dispersion of the coloring matter substance explained above to cation exchange and/or anion exchange, and simultaneously the impurity electrolyte which is newly discharged due to the shift in equilibrium caused by decrease in the concentration of the impurity electrolyte in the dispersion is also removed.

The method of ion exchange is not particularly limited. Preferably, general ion exchange resins with the average particle diameter of about 0.8-1.5 mm can be used. The ion exchange resin is packed into a cylindrical container made of a rigid polyvinyl chloride, the upper and lower ends of which are provided with stainless steel wire cloths having such a mesh size that the ion exchange resin is not leaked into the dispersion or filters having the same function as the wire cloths, and the resulting container is used for the ion exchanging. The structure of the container is preferably such that the ratio of length L and diameter D is in the range of 1 to 5. In the case where both the cation exchange and the anion exchange are carried out, two of these containers can be used, and an anion exchange resin previously activated to OH form and containing no impurity ions is packed in one of them at a volumetric packing rate of, for example, 0.3-0.8, and a cation exchange resin previously activated to H form is packed in the other container under the same conditions as above.

At this ion exchanging stage, the dispersion particles in the dispersion have a wide particle diameter distribution from larger particle diameter to small particle diameter before the ion exchange, but the particle diameter become small during the ion exchanging. Therefore, the mesh size of the filter attached to the upper and lower parts of the ion-exchange column is important. The usable size is 30-100 mesh and preferably 50 mesh. For circulation in the column, it is preferred that the L/D is as small as possible in order that the lineal speed can be as low as possible and the flow rate can be as high as possible.

The packing is preferably not so high so that the resin in the column can move. Furthermore, a circulation pump used in the first stage can also be used in this stage. However, it is preferred to insert the same filter as those equipped at the upper and lower ends of the column, or the filer with smaller mesh in a suction side of the pump. Since the rate of ion exchange is high, the necessary amount of the ion exchange resin is determined, considering the amount of the dispersion, the estimated amount of the impurity, and the set exchange time to obtain a circulation rate. A standard of the circulation rate is such a rate that the ion exchange completes in about 30 minutes with a circulation amount of 2-5 turns per hour.

In the case of carrying out both the cation exchange and the anion exchange, it is necessary to select which should be carried out first, though it depends on the property of the dispersion, namely, the property of the impurity electrolyte. The standard for selection is such that the ion exchange which causes less sedimentation is carried out first. Further, depending on the kind of the electrolytes, the cation and anion exchanges should be carried out alternately. As for the completion of the purification, the change of electrical conductivity of the dispersion with time of the exchange is monitored, and the ion exchange may be continued until the measured value reaches nearly the value of the electrical conductivity of the dispersion particles. As a standard, at the end of the purification, the electrical conductivity may be about 25 µS/cm or lower in the case of dispersion having a concentration of 5% by weight, and about 10 µS/cm or lower in the case of dispersion having a concentration of 2-3% by weight.

At this stage, general ion exchange resins can be used, and there may be used any of strong basic anion exchange resins, weak basic anion exchange resins, strong acidic cation exchange resins and weak acidic cation exchange resins. The structure of the ion exchange resins is not particularly limited, and, for example, may be either porous or gel. In principle, these should be selected depending on the properties of the electrolyte and pH of the dispersion. In general, however, Diaion SA-20A (a strong basic anion exchange resin) and Diaion WK-10 (a weak acidic cation exchange resin), are effective when used ordinarily and, thus, preferable.

At this stage, a dispersion of purified coloring matter substance is obtained.

Next, the dispersion of the purified coloring matter substance is preferably subjected to the process of the third stage. This third stage is a stage for separating the purified coloring matter substance from the dispersion obtained in the second stage. Since the purified coloring matter substance in the form of fine particles is separated, selection of filtering medium and filtering machine is important. For example, the simplest method is to carry out filtration in a filter press with an industrial filter paper having a high wet strength and a large thickness, backed with a broad cloth, and with the dispersed purified coloring matter substance particles as a filter aid. Furthermore, the similar aid filtration may be carried out with a filtering medium of small pore size made of a Saran material.

In principle, a part of the filtrate is reused for circulation washing of the ion exchange column used in the second stage, and returned to a dispersion before the filtration to achieve a closed system.

The filtrate is usually transparent and has an electrical conductivity of 2 µS/cm or less and is only slightly colored even if the particles leak thereinto. The heating residue of the filtrate is at most about 0.03%. Thus, the filtrate can be reused as the deionized water in the first stage for the same coloring matter substance.

The resulting purified coloring matter substance cake containing water has a heating residue of about 40-65% though it depends on the kind of the substance and the degree of squeezing of water at the filtering step.

Preferably, the resulting purified coloring matter substance cake containing water is airtightly stored to avoid drying, and then used in the next step.

Next, the binder resin which is one of the constituents of the colorant of the present invention is preferably carefully chosen on the basis of the fact that the molecular extinction coefficient of the purified coloring matter substance in use increases depending on the chemical environment around the material, namely, increases "in proportion to the concentration (mol/ml) of polar groups, such as acid group or hydroxyl group in unit volume".

If selection is conducted under the condition that the resin contains any polar groups are acceptable, the resins having amino group, sulfone group and —SH group are also included. Since these polar groups have various reactivity, however, the resins with those polar groups should be carefully selected when used in the present invention wherein a coloring matter substance is involved. It is possible to use such resins in the present invention, depending on the improvement and development of the method of the present invention. The inventors found that the preferred polar groups were carboxyl group and hydroxyl group, and further found preferred spatial concentrations of these polar groups.

Therefore, the binder resin in the present invention has a carboxyl group concentration of 0.001 mol/ml or more, or a sum of a carboxyl group concentration and a hydroxyl group concentration of 0.001 mol/ml or more.

Preferably, the binder resin in the present invention comprises one of the following copolymers (A) and (B) or a combination of these copolymers:

copolymer (A) which is a copolymer of at least one of α, β ethylenic polymerizable monomer containing a carboxyl group and at least one of α, β ethylenic polymerizable monomer containing neither carboxyl group nor hydroxyl group, and is prepared so that the carboxyl group concentration in the polymer is 0.001 mol/ml or more, and is obtained by solution polymerization; and copolymer (B) which is a copolymer of at least one α, β ethylenic polymerizable monomer containing a carboxyl group, at least one α, β ethylenic polymerizable monomer containing a hydroxyl group and at least one α, β ethylenic polymerizable monomer containing neither carboxyl group nor hydroxyl group, and is prepared so that a sum of a carboxyl group concentration and a hydroxyl group concentration in the copolymer is 0.001 mol/ml or more, and is obtained by solution polymerization. An aqueous solution or organic solvent solution of the resin can be used for the binder resin.

These three kinds of resins can be prepared by usual solution polymerization at a polymerization temperature of 60-150° C. using a general polymerization initiator. The polymerization solvent is not particularly limited, but a solvent conveniently usable at the subsequent step of kneading with the purified coloring matter substance may be selected. Examples of the solvents usable are alcohols such as methanol, ethanol and isopropanol; ketones such as acetone, methyl ethyl ketone, methyl isobutyl ketone and cyclohexanone; mono- or di-alkyl ether derivatives of ethylene glycol or propylene glycol; esters such as ethyl acetate and butyl acetate; and aromatic solvents such as toluene and xylene; and these are used each alone or as mixed solvents.

After polymerization, the polymers may be diluted with the above solvents or the like, such as water.

As the polymerization initiators, there may be used general initiators, e.g., azo compound initiators, such as azobisisobutyronitrile, and peroxide initiators, such as tert-butyl peroxide.

The above various $\alpha$, $\beta$ ethylenic polymerizable monomers will be explained. Monobasic acids such as acrylic acid and methacrylic acid and dibasic acids such as crotonic acid, citraconic acid and itaconic acid, or monoesters thereof can be used as the $\alpha$, $\beta$ ethylenic polymerizable monomer containing a carboxyl group.

2-Hydroxyethyl (meth)acrylate, 2-hydroxypropyl (meth) acrylate, etc. can be used as the $\alpha$, $\beta$ ethylenic polymerizable monomer containing a hydroxyl group.

As the $\alpha$, $\beta$ ethylenic polymerizable monomer containing neither hydroxyl group nor carboxyl group, for example, styrene, (meth) acrylate esters and other hydrophobic monomers containing no polar groups, etc. can be used.

The above various resins can be prepared using only the polar group concentration as the designing standard. The molecular extinction coefficient of the coloring matter substance increases in proportion to the polar group concentration of carboxyl group or hydroxyl group per unit volume of 1 ml. Therefore, if a desired value of molecular extinction coefficient is decided, by obtaining the polar group concentration per unit volume of 1 ml corresponding to the above desired value, the amount of the $\alpha$, $\beta$ ethylenic polymerizable monomer containing hydroxyl group or carboxyl group to be introduced into the binder resin can be estimated. The estimation is based on the fact that the specific gravity of the binder resin is generally in the range of 1.1-1.4 though it increases with the introduction of the polar group.

The polar group concentration (carboxyl group concentration or a sum of carboxyl group concentration and hydroxyl group concentration) is preferably 0.001 mol/ml or more. By designing the concentration to be as high as possible, the improvement of molecular extinction coefficient can be obtained. The upper limit of the concentration is a concentration of a resin made of the functional group-containing monomer only in each resin.

Even when the concentration is less than the above range, the effect of introducing the polar group may be exhibited, but conspicuous effect cannot be expected.

In the present invention, the binder resin solution obtained by the above method is further purified by an ion exchange. The purpose of the purification is to remove polymerization inhibitor previously added to the polymerizable monomer introduced at the polymerization step, side reaction product of the initiator produced during polymerization, residual unpolymerized monomers having polar group or impurity electrolytes contained in the polymerization solvent.

If these impurities are present, color tone given by the spectrum which the purified coloring matter substance shows is damaged because the coloration or the like is brought about while the binder resin is exposed to a high-temperature history after mixed or kneaded with the purified coloring matter substance, or the mixture or kneaded product is used for a long period of time.

The method for purification of the binder resin (ion exchanging method) in the present invention is not particularly limited. Preferably, an anion exchange resin previously activated to OH form and/or a cation exchange resin previously activated to H form are ground to powders having a particle diameter distribution of 10-1000 µm and, if necessary, dried to obtain a powdery ion exchange resin. The resulting powdery ion exchange resin is added in an amount of 0.1-10% by weight to the above binder resin solution, followed by stirring and removing the powdery ion exchange resin to perform the purification of the binder resin.

When both the cation exchange and the anion exchange are carried out, either of them can be carried out first. The two ion exchange resin powders can be simultaneously added, followed by stirring or the cation exchange and the anion exchange may be alternately repeated. The ion exchange with the powdery exchange resin exhibits similar ion exchange effects in both an organic solvent and water.

The ion exchange resins usable are those of the above-mentioned kinds or structures. The time required for the ion exchanging is not particularly limited, but ion exchanging for 30 minutes or longer suffices.

For grinding of the ion exchange resin, a ball mill, a mortar type grinder, a stone mill type grinder, etc. can be used.

The powdery ion exchange resin after being used for ion exchanging can be simply removed by filtration under pressure using a filter medium which can trap the powders in the direction perpendicular to the surface of the filter medium or using a filter aid which has the similar function.

Even when the resulting purified binder resin solution alone is formed into a coating film with a thickness of 100 µm and is forcedly exposed to a heat history at 250° C. for several hours, the film does not optically show any absorbance in the wavelength region of 500 nm or less. Therefore, for this reason, it became possible to use the purified binder resin as an excellent binder resin which does not hinder the inherent absorption spectrum of the purified coloring matter substance. The purified binder thus constitutes one element of the present invention.

Next, a step of producing a colorant precursor from the purified coloring matter substance and the purified binder resin for obtaining the colorant of the present invention will be described.

The colorant precursor can be obtained by kneading the purified coloring matter substance and the purified binder resin.

An equipment for producing usual paints, inks or master batches can be employed in this step. However, in the equipment in use, a material having no impurity electrolyte, which causes re-aggregation of the coloring matter substance as mentioned above, are to be used. Further, in this process, since the aggregates of the coloring matter substance have been already broken down and, thus, the coloring matter substance has the inherent particle diameter distribution, the dispersion can be carried out very easily, unlike the conventional processes.

Specifically, for example, the colorant precursor can be obtained as:

a solid dispersion of the purified coloring matter substance in the purified binder resin, obtained by kneading with heating the purified coloring matter substance and the purified binder resin by a kneading machine equipped with a distillation device and a kneading device, while distilling a liquid being discharged from the purified binder resin solution under the condition of reduced pressure or atmospheric pressure, or a solution of the thus-obtained solid dispersion in a medium suitable for the intended application;

a liquid colorant precursor obtained by dispersing the purified coloring matter substance in the binder resin solution by a usual liquid kneading device, namely, a dispersing machine using a ball mill, a sand grinder or zirconia beads; or a liquid colorant precursor comprising the binder resin solution and the purified coloring matter substance dispersed in the solution which is prepared by simply mixing the purified coloring matter substance and the purified binder resin solution by a usual stirrer.

Since the resulting colorant precursor is produced through the additional dispersion or dissolution step as mentioned above, there is the possibility that some impurities introduced in the above step cause the aggregation of the coloring matter substance. Therefore, the colorant precursor is subjected to an ion exchange in order to produce the colorant of the present invention.

The step of subjecting the colorant precursor to ion exchange is a final step for obtaining the colorant of the present invention. The method of the ion exchange is not particularly limited, but preferably it can be carried out in the same manner as employed for the above ion exchange of the binder resin solution. That is, preferably, 0.1-10% by weight of a powdery anion exchange resin previously activated to OH form and/or a powdery cation exchange resin previously activated to H form which are dried, if necessary, and has a particle diameter distribution of 10-1000 µm is added to the colorant precursor, followed by stirring and removing the resin by filtration under pressure.

After the ion exchanging, if necessary, coarse particles can be further removed by an ultra-high speed centrifugal separator. The steps until the filtration under pressure can be carried out in accordance with the ion exchanging steps of the binder resin solution.

The removal of the coarse particles by an ultra-high speed centrifugal separator can be carried out by a commercially available ultra-high speed centrifugal separator, for example, under an optimum condition in the range of 5000-15000 rpm, though it depends on the particle diameter of coarse particles to be separated.

Thus, the production of colorants excellent in color development of the present invention is completed.

The present invention will be further explained by the following examples.

EXAMPLE 1

Purification (1) of a Coloring Matter Substance by Ion Exchanging Method

Five kilograms of copper phthalocyanine blue pigment L6700F was charged into five 10L round vessels (i.e. 1 kg each) equipped with a variable speed stirrer having an agitating blade made by working an SUS plate having a width of 15 mm, a length of 350 mm and a thickness of 2 mm into a shape of bow.

Then, the pigment was kneaded at a controlled rotational speed of 375 rpm or less until it became dough while adding deionized water with an electric conductivity of 0.95 µS/cm to each of the vessels at a rate of 0.11 kg/min. The time required was 10 minutes and the amount of the deionized water required was 1.1 kg. The addition rate of the deionized water was increased to 0.20 kg/min to fluidize the pigment in the form of dough. In this case, the amount of the deionized water added was 0.6 kg. Then, 0.4 kg of a 5% aqueous acetic acid solution was added to prepare a slurry. Each of 5 sets of slurries prepared in the same manner was transferred to a rectangular plastic vessel of 350 L and deionized water was added thereto to obtain a dispersion of 1.43-2%.

Eight litres of an anion exchange resin Diaion SA-20A activated to OH form and 8 L of a cation exchange resin WK-10 activated to H form were packed respectively into two ion exchange columns made of rigid PVC which had an inner diameter of 200 mm and a height of 400 mm and was provided with 50 mesh SUS wire clothes at both ends. The above dispersion was subjected to cation exchanging and then anion exchanging. The average circulation speed in the cation exchanging was 15.1 L/min and the average circulation speed in the anion exchanging was 12.9 L/min.

The properties of the dispersion before and after the ion exchanging were as follows.

| Item | Volume | Concentration of pigment | Electrical conductivity µS/cm | pH |
| --- | --- | --- | --- | --- |
| Before ion exchanging | 250 L | 2% | 122.0 | 2.91 |
| After cation exchanging | 300 L | 1.67% | 98.2 | 3.42 |
| After anion exchanging | 340 L | 1.43% | 17.6 | 7.97 |

The purified dispersion was filtered by a filter press to obtain a purified pressed cake. The conditions of using the filter press were as follows.

Pressure: 0.15-0.2 MPa

Filtration rate: 3.3 L/min

Filtrate characteristics:

Electrical conductivity 14.1 µS/cm pH=5.34

Transparency: Transparent with very slight blue color

Heating residue: 0.03%

Characteristics of cake: Heating residue: 47.3%

Amount of collected cake: 7 kg

The coloring matter substance before and after purification was subjected to X-ray fluorescence analysis for quantification of copper. The results are shown in the following table.

| Sample | Heating residue % | Concentration of copper atom |
| --- | --- | --- |
| L6700F RAW (unpurified cake) | 40.37 | 47.60 |
| L6700F EX (purified cake) | 39.64 | 47.52 |

From the above results, it can be judged that the pigment was not broken at the purification step.

Furthermore, spectrum measurement was conducted on the coloring matter substance before and after purification.

FIG. 1 shows the results of measurement of molecular extinction coefficient. As shown in FIG. 1, the molecular extinction coefficient markedly increased by the purification with ion exchanging.

EXAMPLE 2

Purification (2) of Coloring Matter Substance by Ion Exchanging Method

Purification of the coloring matter substance was carried out in accordance with Example 1, except that Hostaperm Violet RL-Sp (manufactured by Clariant Co., Ltd.) was used in an amount of 3 kg and the concentration of the dispersion was 5%. Other conditions were as follows.

Conditions for preparation of dispersion: The same as in Example 1, except that 0.010 kg of ammonia (0.2 kg as 5% aqueous ammonia) per 1 kg of the pigment was added in place of acetic acid.

Ion exchanging conditions: A centrifugal pump having a lift of 25.5 m was used in place of the gear pump, and flow rate was 16 L/min in anion exchanging and 34.7 L/min in cation exchanging. The ion exchanging step was carried out by alternate ion exchanging, and the data of the coloring matter substance before and after ion exchanging are as follows.

| Item | Volume | Concentration of pigment | Electrical conductivity μS/cm | pH |
|---|---|---|---|---|
| Before ion exchanging | 60 L | 5% | 210.3 | 8.22 |
| After anion exchanging | 60 L | | 203.6 | 8.01 |
| After cation exchanging | 60 L | | 46.7 | 3.85 |
| After second anion exchanging | 60 L | | 14.15 | 6.32 |

The purified dispersion was filtered by a filter press to obtain a purified pressed cake. The conditions of using the filter press were as follows.
 Pressure: 0.15-0.2 MPa
 Filtration speed: 0.6 L/min
 Filtrate characteristics:
  Electrical conductivity=9.5 μS/cm
  Transparency: Transparent
  Heating residue: 0%
Characteristics of cake:
 Heating residue: 46.8%
 Amount of collected cake: 5.6 kg (yield 87.4%)

Figure 2:
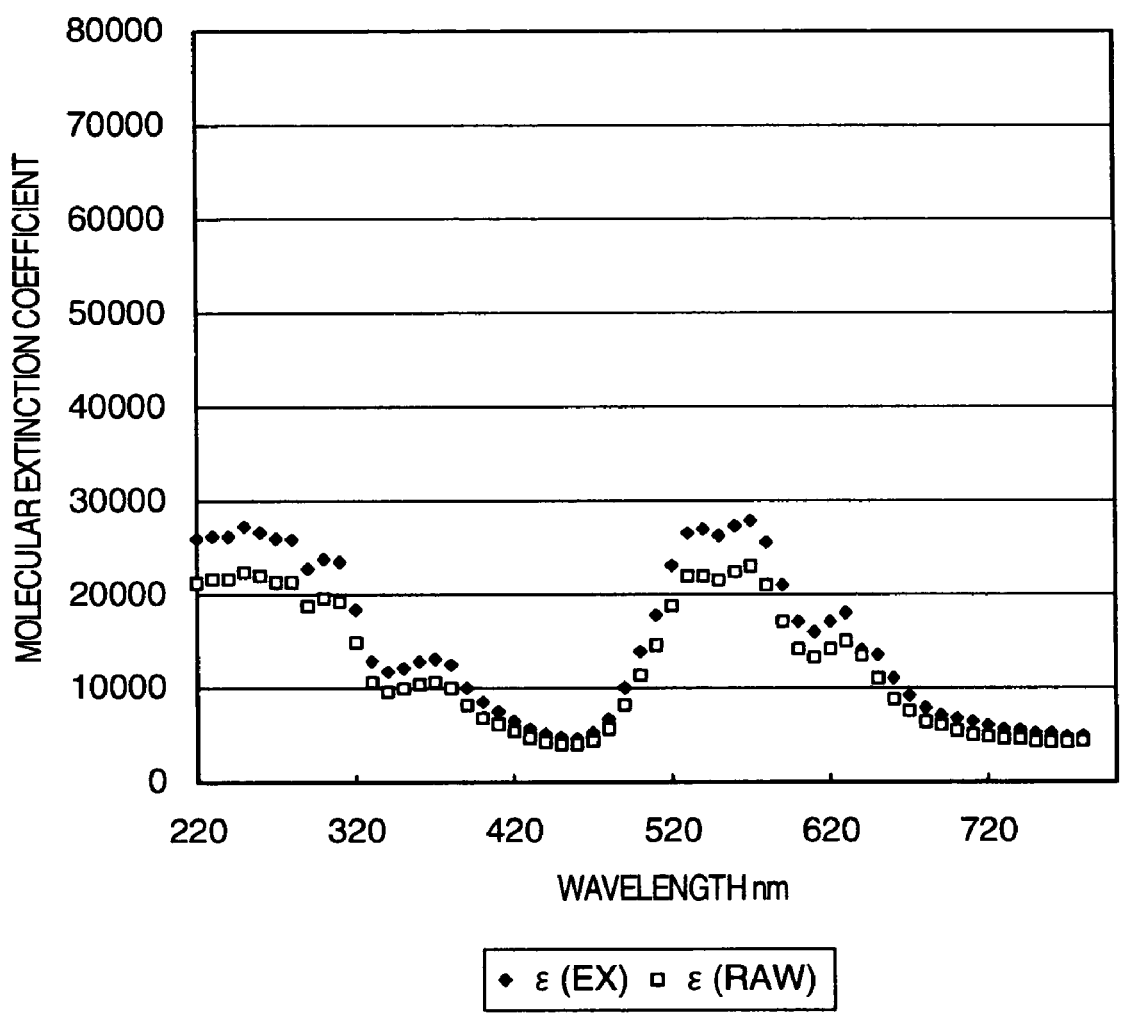
FIG. 2 shows the results of spectrum measurement of a dispersion of Hostaperm Violet RL-Sp before purification ($\epsilon$(RAW)) and after purification ($\epsilon$(EX)).
Figure 3:
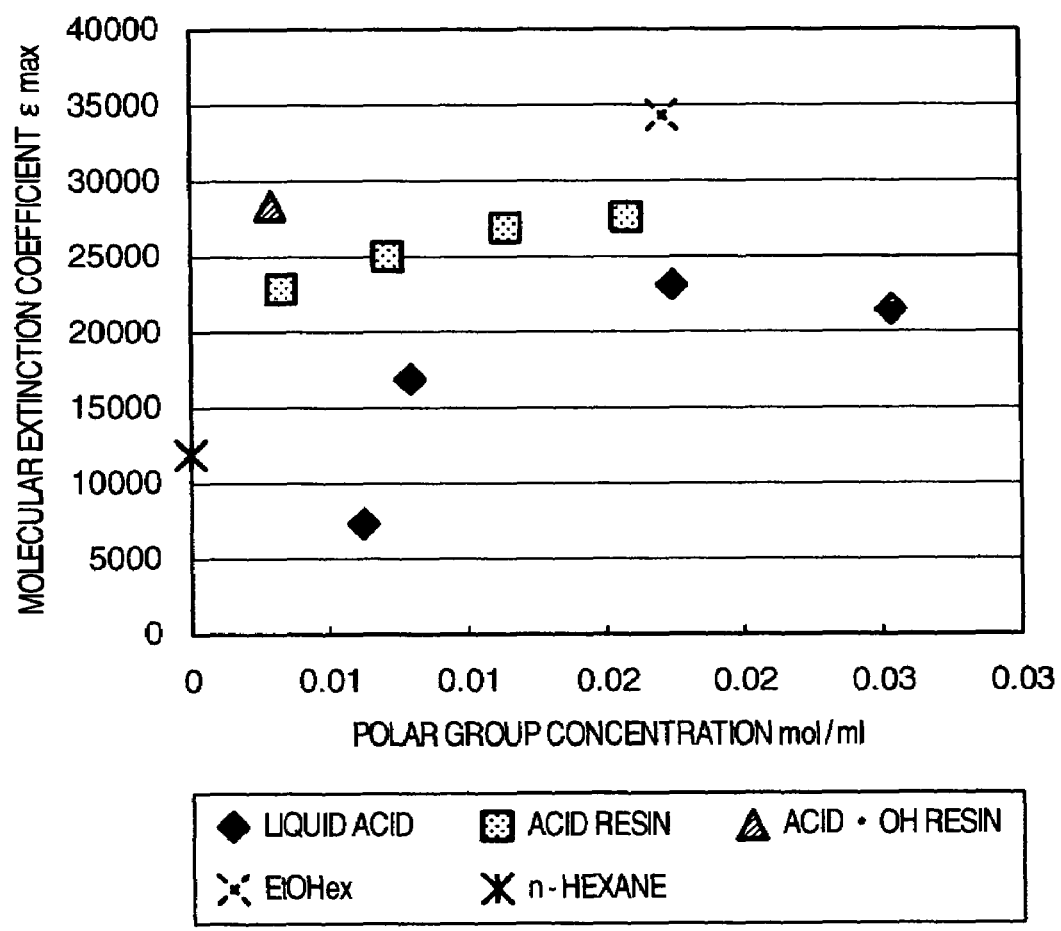
FIG. 3 is a graph which shows the dependency of molecular extinction coefficient of a coloring matter substance on atmosphere (i.e. the concentration of polar group (mol/ml) in a medium (polymer)) shown in Table 4.

The coloring matter substance before and after purification was subjected to spectrum measurement. FIG. 2 shows the results of measurement of molecular extinction coefficient. As shown in FIG. 2, when Hostaperm Violet RL-Sp was used, the molecular extinction coefficient also markedly increased by the purification with ion exchanging as in Example 1.

EXAMPLE 3

Synthesis of Binder Resin and Effect of Purification

Two hundred parts by weight of PMA (propylene glycol monomethyl ether acetate) was charged into a four-necked flask of 2 L equipped with a variable speed stirrer, a reflux condenser, a thermometer and a dropping funnel and was heated up to 85° C. with a water bath, and then the following compounds were added thereto dropwise over a period of 120 minutes while keeping this temperature.

| | |
|---|---|
| Benzyl methacrylate BZMA | 144.6 parts by weight |
| Methacrylic acid MAA | 15.4 parts by weight |
| 2-Hydroxyethyl methacrylate HEMA | 40.0 parts by weight |
| Dimethyl 2,2-azobis(2-methylpropionate) V601 | 1.5 part by weight |

The above temperature was further kept for 240 minutes, followed by cooling to 50° C. Then, 100 parts by weight of PMA was added, followed by stirring and diluting to obtain a resin solution. The resulting resin solution had the following characteristics: a viscosity of 370.4 mPa·sec at 25° C., a heating residue of 38.7% after heating at 150° C. for 2 hrs, a weight-average molecular weight of about $21.5 \times 10^3$, and an acid value of 51.1 in terms of solid matter.

To 200 parts by weight of the above resin solution was added 10 parts by weight of a strong base type anion exchange resin activated to OH form, Diaion SA-20A manufactured by Mitsubishi Chemical Co., Ltd. from which water was sufficiently removed with a filter paper and which was powdered in an earthenware mortar, and the mixture was stirred at room temperature for 30 minutes. The mixture was then carefully filtered by a small-sized pressure filtration machine using a filter fabric with flannel on one side onto which industrial filter paper No. 126 is laid. The resulting resin solution had a heating residue of 39.5% and an acid value of 50.2 in terms of solid matter. The resulting purified resin solution is referred to as PR1. The powder ion exchange resin had a particle size in the range of 35-500 μm as measured by an optical particle size distribution meter CAPA500 (manufactured by Horiba Mfg. Co., Ltd.) and an average particle diameter of 150 μm.

The resulting resin solution and a resin solution which was not subjected to ion exchanging were adjusted to the same heating residue concentration of 24%, and were coated on well washed glass plates by a #16 bar coater and dried at 60° C. for 10 minutes. Then, the transmittance of the coats was measured. Thereafter, the samples were baked at 250° C. for 60 minutes, and the transmittance thereof was measured again. The results are shown in Table 1.

As can be seen from Table 1, the resin purified by ion exchanging was hardly optically influenced by heat history.

TABLE 1

Transmittance (%) before and after exposing to heat history

| | Resin solution subjected to no ion exchanging | | Resin solution subjected to ion exchanging | |
|---|---|---|---|---|
| Wavelength nm | After drying | After exposure to heat history | After drying | After exposure to heat history |
| 380 | 99.88 | 95.47 | 99.91 | 97.44 |
| 390 | 99.71 | 96.17 | 99.8 | 97.82 |
| 400 | 99.65 | 96.74 | 99.63 | 98.04 |
| 410 | 99.57 | 97.26 | 99.73 | 98.3 |
| 420 | 99.69 | 97.73 | 99.72 | 98.58 |
| 430 | 99.62 | 98.03 | 99.77 | 98.8 |
| 440 | 99.73 | 98.34 | 99.71 | 98.9 |
| 450 | 99.65 | 98.56 | 99.73 | 99.04 |
| 460 | 99.7 | 98.75 | 99.68 | 99.08 |

TABLE 1-continued

Transmittance (%) before and after exposing to heat history

| | Resin solution subjected to no ion exchanging | | Resin solution subjected to ion exchanging | |
|---|---|---|---|---|
| Wavelength nm | After drying | After exposure to heat history | After drying | After exposure to heat history |
| 470 | 99.56 | 98.85 | 99.71 | 99.16 |
| 480 | 99.71 | 99.0 | 99.71 | 99.19 |

EXAMPLE 4

Preparation of Binder Resins with Various Polar Group Concentrations and Purification of the Same Binder resins with various polar group concentrations were prepared in accordance with the preparation method of Example 3, changing the charged composition, the dropped composition and the diluted composition as shown in the following Table 2.

TABLE 2

| | Initial charging amount of Components | | Amount of Components added dropwise | | | | | | | Amount of dilution Components | | |
|---|---|---|---|---|---|---|---|---|---|---|---|---|
| Resin | DIW | IPA | MAA | BZMA | HEMA | IPA | DIW | EAC | V601 | IPA | DIW | EAC |
| R2 | | 20 | 40 | | | 10 | 20 | | 1.6 | | 19.2 | |
| R3 | 5 | 20 | 30 | 10 | | 10 | 5 | | 1.6 | 15 | 5 | |
| R4 | 5 | 20 | 20 | 20 | | 10 | 5 | | 1.6 | 5 | | 15 |
| R5 | | 25 | 10 | 30 | | 10 | | 5 | 1.6 | 15 | | 5 |
| R6 | 20 | 20 | 30 | | | 10 | 10 | | 1.6 | | | |

The numerals indicate the amounts in part by weight, and DIW denotes deionized water, IPA denotes isopropyl alcohol and EAC denotes ethyl acetate.

These resin solutions R2, R3, R4, R5 and R6 were subjected to the ion exchanging employed in Example 3 to obtain purified resin solutions PR2, PR3, PR4, PR5 and PR6, respectively. The compositions and properties of these purified resin solutions are shown in Table 3. In Table 3, the composition and properties of the purified resin solution PR1 of Example 3 are also shown.

EXAMPLE 5

Dependency of Molecular Extinction Coefficient on Polar Group Concentration in Dispersion Obtained by Flushing Method Chip-like solid dispersions were prepared by using the purified pressed cake of Heliogen Blue L6700F pigment which was a purified coloring matter substance obtained in Example 1 and the purified binder resin solutions of PR1 to PR5 obtained in Example 4.

The preparation was carried out by a flushing method. The purified pressed cake having a heating residue of 47.3% (the remainder being water) obtained in Example 1 was added to the purified resin solution obtained in Example 4 in such an amount that the weight ratio of the pigment in the cake to the resin in the purified resin solution obtained in Example 4 reached finally 2:1 (P/B=2/1). The resulting mixture was kneaded by a kneader having a capacity of 0.5 L, equipped with a vacuum distiller at a kneading temperature of 90° C. or higher, while vacuum distilling the separated water. The kneading was continued until the ultimate temperature reached 110° C. or higher to finally obtain a solid dispersion.

Specifically, first, 270 parts by weight of the pressed cake and 50 parts by weight of the resin solution were charged into the kneader, and the kneading was started.

Then, after lapse of 10 minutes, 50 parts by weight of the resin solution was added;

after lapse of 20 minutes, 50 parts by weight of the resin solution was added;

after lapse of 40 minutes, 50 parts by weight of the resin solution and 80 parts by weight of the cake were added;

TABLE 3

| | | | | | | | | Characteristics of solution | | | Characteristics of resin in terms of solid matter | | |
|---|---|---|---|---|---|---|---|---|---|---|---|---|---|
| Resin solution | Composition of monomer | | | Composition of solvent | | | | | Viscosity | Acid | | Specific | Polar group concentration |
| | BZMA | MAA | HEMA | EAC | IPA | H₂O | PMA | NV % | mPA·s | value | OH value | gravity | mol/ml |
| PR1 | 72.3 | 7.7 | 20 | | | | 100 | 39.5 | 450 | 50 | 86 | 1.203 | 0.00293 |
| PR2 | | 100 | | | 47 | 53 | | 37.7 | 9270 | 652 | | 1.355 | 0.01576 |
| PR3 | 25 | 75 | | | 75 | 25 | | 37 | 6400 | 489 | | 1.316 | 0.01147 |
| PR4 | 50 | 50 | | 25 | 58 | 17 | | 41.1 | 3940 | 326 | | 1.229 | 0.00715 |
| PR5 | 75 | 25 | | 17 | 83 | | | 39 | 616 | 163 | | 1.142 | 0.00336 |
| PR6 | | 100 | | | 50 | 50 | | 39.2 | 2740 | 652 | | 1.355 | 0.01576 |

Note:
NV % indicates heating residue %.

after lapse of 175 minutes, 50 parts by weight of the resin solution and 80 parts by weight of the cake were added;

after lapse of 220 minutes, 56 parts by weight of the resin solution and 88 parts by weight of the cake were added;

for 220-295 minutes after starting of the kneading, temperature of the content gradually and automatically rose together with the increase of torque; and after lapse of 295 minutes, the temperature reached 110° C., and at this time the content was cooled and taken out to complete the kneading.

The resulting dispersion was formed into a sheet, and five different portions thereof were sampled at n=4 and quantitative analysis was conducted on copper atom in the samples by X-ray fluorescence analysis to confirm that the pigment concentration was uniform. The resulting dispersion was completely dissolved in PGM (propylene glycol monomethyl ether) or PMA so as to give a concentration of 25% by a high-speed stirrer and a paint conditioner. The solvents and heating residues were as follows.

| Sample | Purified resin solution used | Heating residue % | Solvent used |
|---|---|---|---|
| PR2-DFM | PR2 | 86.3 | PGM |
| PR3-DFM | PR3 | 93.6 | PGM |
| PR4-DFM | PR4 | 89.7 | PGM |
| PR5-DFM | PR5 | 93.1 | PGM |
| PR1-DFM | PR1 | 89.8 | PMA |

The above five samples were the colorant precursors in the present invention.

Each of the samples was uniformly diluted to the spin coating viscosity and coated onto a glass plate to have a thickness of 0.7 μm. Then, spectrum measurement was conducted on the coat and the molecular extinction coefficient of the coloring matter substance in the respective colorant precursors was obtained. The relation between the molecular extinction coefficient and the atmosphere in which the coloring matter substance was placed, namely, the polar group concentration in unit volume was studied. The results are shown in Table 4.

TABLE 4

Dependency of molecular extinctioncoefficient of purified L6700F in colorant precursor on atomosphere

| Substance of atmosphere | Composition and characteristics of atmosphere | | | | | | Polar group concentration mol/ml | | Molecular extinction coefficient of absorption maximum ε max | | | | | Specific gravity of colorant |
|---|---|---|---|---|---|---|---|---|---|---|---|---|---|---|
| | BZMA | MAA | HEMA | Acid value | OH value | Specific gravity | spatial Medium | concentration | Liquid acid | Acid resin | OH resin | EtOHex | EtOHraw | n-Hexane | |
| PR2 | | 100 | | 652 | | 1.355 | 0.01576 | 0.00525 | | 27732 | | | | | 1.538 |
| PR3 | 25 | 75 | | 489 | | 1.316 | 0.01147 | 0.00382 | | 26847 | | | | | 1.521 |
| PR4 | 50 | 50 | | 326 | | 1.229 | 0.00715 | 0.00238 | | 25295 | | | | | 1.481 |
| PR5 | 75 | 25 | | 163 | | 1.142 | 0.00336 | 0.00112 | | 23002 | | | | | 1.437 |
| PR1 | 72.3 | 7.7 | 20 | 50 | 86 | 1.203 | 0.00293 | 0.00098 | | | 28433 | | | | 1.468 |
| n-Hexane | | | | | | 0.66 | 0 | 0 | | | | | | 11700 | |
| EtOH | | | | | | 0.789 | 0.0171 | 0.0171 | | | | 34270 | 30278 | | |
| Formic acid | | | | | | 1.216 | 0.02532 | 0.02532 | 21488 | | | | | | |
| Acetic acid | | | | | | 1.049 | 0.01747 | 0.01747 | 23032 | | | | | | |
| Hexanoic acid | | | | | | 0.92 | 0.00792 | 0.00792 | 16887 | | | | | | |
| Octanoic acid | | | | | | 0.91 | 0.00631 | 0.00631 | 7365 | | | | | | |

The specific gravity of colorant was calculated in additive property assumption, taking the specific gravity d of L6700F to be d=1.65.

The molecular extinction coefficient was calculated from found value assuming the molecular weight of L6700F to be 576.062 using specific gravity of the colorant.

The spatial concentration was obtained by multiplying the value of medium by 1/3 from P/B=2/1. This means that the polar group concentration in the medium (polymer) was diluted with the purified coloring matter substance containing no polar group.

"EtOHex" and "EtOHraw" indicate the measured value of the purified coloring matter substance in EtOH solution and that of the unpurified coloring matter substance in EtOH solution, respectively.

In Table 6, the results of the following Example 6 are also shown.

This Example shows key points relating to the object of the present invention. The means for enhancing the molecular extinction coefficient of the coloring matter substance itself is only the step of purifying the dispersion of the coloring matter substance by ion exchanging in the present invention. Other steps included in the present invention are to bring the molecular extinction coefficient infinitely close to the value enhanced as above. This Example clearly illustrates the subject matter of the present invention: firstly the molecular extinction coefficient is enhanced by ion exchanging of the coloring matter substance, thereby to afford a room for increasing B (resin) in P/B;

then a composition is designed and employed so as to enhance the effect of increasing the polar group concentration which is a role of resin and improve the quality of the effect; it thus becomes possible to achieve the limit value of the molecular extinction coefficient as much as possible and to eliminate the factors adversely affecting the present process.

EXAMPLE 6

Relations between Molecular Extinction Coefficient of Various Purified Coloring Matter Substances and Polar Group Concentration in Acidic Pure Liquid By using the same method of purifying coloring matter substance as in Example 1, the following pigments were purified.

Paliotol Yellow D1819
Irgaphor Red B-CF
Heliogen Green L9361

Five purified coloring matter substances including the above purified pigments and the purified pigments Lionol Blue L6700F and Hostaperm Violet RL-Sp in Examples 1 and 2, respectively, were subjected to spectrum measurement in a liquid acid (pure substance), and effects of the atmospheres having different polar group concentrations on the molecular extinction coefficient were investigated. Since the measurement is carried out by using a diluted solution, a solution with accurate concentration in g/g was prepared using the measured value of heating residue with neglecting water in the purified pressed cake. The absorbance was measured by a spectro photometer U3400 manufactured by Hitachi Co., Ltd. The molecular extinction coefficient was obtained from the measured value and specific gravity of the liquid and molecular weight of the coloring matter substance. The results are shown in Table 5.

TABLE 5

| Coloring material | Substance | Characteristics of atmosphere | | Molecular extinction coefficient ϵ max | | |
|---|---|---|---|---|---|---|
| | | Specific gravity | Polar group concentration mol/ml | Acid | EtOH Pig = EX | n-Hexane |
| L6700F | Formic acid | 1.216 | 0.02531 | 21488 | | |
| M = 576 | Acetic acid | 1.0492 | 0.01747 | 23032 | | |
| | Hexanoic acid | 0.92 | 0.00792 | 16887 | | |
| | Octanoic acid | 0.91 | 0.00631 | 7365 | | |
| | EtOH | 0.7892 | 0.0171 | | 34270 | |
| | n-Hexane | 0.6603 | 0 | | | 11700 |
| D1819 | Formic acid | 1.216 | 0.02531 | 10584 | | |
| M = 367 | Acetic acid | 1.0492 | 0.01747 | 12910 | | |
| | n-Butyric acid | 0.9563 | 0.01085 | 10137 | | |
| | Hexanoic acid | 0.92 | 0.00792 | 6602 | | |
| | Octanoic acid | 0.91 | 0.00631 | 6964 | | |
| | EtOH | 0.7892 | 0.0171 | | 12797 | |
| | n-Hexane | 0.6603 | 0 | | | 1332 |
| B-CF | Formic acid | 1.216 | 0.02531 | 13600 | | |
| M = 357 | Acetic acid | 1.0492 | 0.01747 | 16446 | | |
| | n-Butyric acid | 0.9563 | 0.01085 | 14116 | | |
| | Hexanoic acid | 0.92 | 0.00792 | 12735 | | |
| | Octanoic acid | 0.91 | 0.00631 | 14057 | | |
| | EtOH | 0.7892 | 0.0171 | | 17621 | |
| | n-Hexane | 0.6603 | 0 | | | 1166 |
| L9361 | Formic acid | 1.216 | 0.02531 | 13128 | | |
| M = 1127 | Acetic acid | 1.0492 | 0.01747 | 18443 | | |
| | n-Butyric acid | 0.9563 | 0.01085 | 18580 | | |
| | Hexanoic acid | 0.92 | 0.00792 | 10278 | | |
| | Octanoic acid | 0.91 | 0.00631 | 12030 | | |
| | EtOH | 0.7892 | 0.0171 | | 21688 | |
| | n-Hexane | 0.6603 | 0 | | | 11671 |

TABLE 5-continued

| Coloring material | Substance | Characteristics of atmosphere | | Molecular extinction coefficient ε max | | |
|---|---|---|---|---|---|---|
| | | Specific gravity | Polar group concentration mol/ml | Acid | EtOH Pig = EX | n-Hexane |
| RL-Sp M = 726 | Formic acid | 1.216 | 0.02531 | 27764 | | |
| | Acetic acid | 1.0492 | 0.01747 | 21447 | | |
| | n-Butyric acid | 0.9563 | 0.01085 | 19402 | | |
| | Hexanoic acid | 0.92 | 0.00792 | 20612 | | |
| | Octanoic acid | 0.91 | 0.00631 | 9781 | | |
| | EtOH | 0.7892 | 0.0171 | | 27251 | |
| | n-Hexane | 0.6603 | 0 | | | 9362 |

This Example shows that the molecular extinction coefficient of the coloring matter substance increases with the increase of concentration of acid group in liquid space. Example 5 shows that the same effect was observed in the resin and the liquid, although there was a difference in the level of the effect. Therefore, this Example shows the possibility of extension of the present invention to general coloring matter substances.

COMPARATIVE EXAMPLE 1

Polar Group Concentration and Molecular Extinction Coefficient of Various Pigments in Pure Liquid Effect of the polar group concentration was investigated using basic substances in accordance with Example 6. The results are shown in Table 6.

Even if these polar groups are introduced into the binder resin, therefore, it cannot be expected that the purpose of the present would be achieved.

EXAMPLE 7

Illustration by Dissolution Dispersing Method

This Example shows an example of use where the dispersing method which is difficult to accomplish at the present technical standard can be readily performed for obtaining the colorant precursor from the purified coloring matter substance and the purified binder resin. This method became possible for the first time because the amount of the impurity electrolyte which causes the inhibition of dispersion is reduced by using the purified coloring matter substance and the purified binder resin.

TABLE 6

| Coloring Matter Substance | Characteristics of atmosphere | | | Molecular extinction coefficient ε max | | |
|---|---|---|---|---|---|---|
| | Substance | Specific gravity | Polar group concentration mol/m | Base | EtOH Pig = EX | n-Hexane |
| L6700F M = 576 | Triethylamine | 0.727 | 0.007184 | 8964 | | |
| | Tripropylamine | 0.7567 | 0.005281 | 8366 | | |
| | Tributylamine | 0.78 | 0.004207 | 3955 | | |
| | EtOH | 0.7892 | 0.0171 | | 34270 | |
| | n-Hexane | 0.6603 | 0 | | | 11700 |
| D1819 M = 367 | Triethylamine | 0.727 | 0.007184 | 4871 | | |
| | Tripropylamine | 0.7567 | 0.005281 | 3747 | | |
| | Tributylamine | 0.78 | 0.004207 | 991 | | |
| | EtOH | 0.7892 | 0.0171 | | 12797 | |
| | n-Hexane | 0.6603 | 0 | | | 1332 |
| B-CF M = 357 | Triethylamine | 0.727 | 0.007184 | 9518 | | |
| | Tripropylamine | 0.7567 | 0.005281 | 9191 | | |
| | Tributylamine | 0.78 | 0.004207 | 5493 | | |
| | EtOH | 0.7892 | 0.0171 | | 17621 | |
| | n-Hexane | 0.6603 | 0 | | | 1166 |
| L9361 M = 1127 | Triethylamine | 0.727 | 0.007184 | 8538 | | |
| | Tripropylamine | 0.7567 | 0.005281 | 14962 | | |
| | Tributylamine | 0.78 | 0.004207 | 15246 | | |
| | EtOH | 0.7892 | 0.0171 | | 21688 | |
| | n-Hexane | 0.6603 | 0 | | | 11671 |
| RL-Sp M = 726 | Triethylamine | 0.727 | 0.007184 | 11903 | | |
| | Tripropylamine | 0.7567 | 0.005281 | 14163 | | |
| | Tributylamine | 0.78 | 0.004207 | 12049 | | |
| | EtOH | 0.7892 | 0.0171 | | 27251 | |
| | n-Hexane | 0.6603 | 0 | | | 9362 |

The basic atmosphere had substantially no effect to enhance the molecular extinction coefficient and this was the same level as of hexane which was a non-polar medium.

Phthalocyanine pigment ECB-301 (Pigment Blue 15:3, manufactured by Dainichiseika Co., Ltd.) was purified in accordance with the procedure of Example 1 to obtain a pressed cake having a heating residue of 40%. Furthermore, the pressed cake and the purified binder resin PR6 (heating residue: 39.2%) obtained in Example 4 were mixed at the following formulations, and the mixture was stirred for 30 minutes at 2000 rpm by a high-speed stirrer Disperser to prepare a colorant precursor.

| Sample | Pressed cake | Binder resin PR6 | P/B |
|---|---|---|---|
| S1 | 10 parts by weight | 5 parts by weight | 2/1 |
| S2 | 10 parts by weight | 10 parts by weight | 1/1 |

These were diluted by 10000 times with deionized water, and particle diameter was measured by a laser scattering type particle diameter distribution meter (manufactured by Microtrack Co., Ltd., UPA). The results were as follows.

|    | D10 | D50 | D90 |
|---|---|---|---|
| S1 | 0.1753 | 0.3642 | 3.2959 |
| S2 | 0.1053 | 0.2079 | 1.9761 |

By the same method, S3 was prepared using the pressed cake pigment L6700F of Example 1 and PR6 under the condition of P/B=1/1. Similarly, the particle diameter distribution was measured. The results of measurement are shown in Table 7.

TABLE 7

Particle diameter distribution of colorant precursor

| Particle diameter μm | Frequency % | Particle diameter μm | Frequency % |
|---|---|---|---|
| 0.009 | 0 | 0.0859 | 6.46 |
| 0.0107 | 0 | 0.1022 | 6.47 |
| 0.0128 | 0 | 0.1215 | 6.8 |
| 0.0152 | 0 | 0.1445 | 7.34 |
| 0.0181 | 0 | 0.1719 | 7.73 |
| 0.0215 | 0 | 0.2044 | 7.29 |
| 0.0255 | 0 | 0.2431 | 5.51 |
| 0.0304 | 2.38 | 0.2891 | 2.96 |
| 0.0361 | 11.4 | 0.3437 | 1.04 |
| 0.043 | 11.03 | 0.4088 | 0 |
| 0.0511 | 9.05 | 0.4861 | 0 |
| 0.0608 | 7.69 | 0.5781 | 0 |
| 0.0723 | 6.85 | 0.6875 | 0 |

This example shows that the colorant precursors of the present invention can be simply prepared by using the purified starting materials according to the present invention.

EXAMPLE 8

The Necessity of Final Ion Exchanging Step

Next, the reason why the final step of the present invention is necessary will be shown.

Using the solid colorant precursors PR2-DFM and PR4-DFM obtained in Example 5, a solution was prepared at the following formulation.

| PR2-DFM | 1 part by weight |
| PR4-DFM | 9 parts by weight |
| NMP (N-methyl-2-pyrrolidone) | 40 parts by weight |
| PK-208 | 1 part by weight |

PK-208 (cation exchange resin "Diaion" manufactured by Mitsubishi Chemical Co., Ltd.) was activated to H form, then sufficiently dried at 60° C. and powdered in accordance with the above Examples before use. The dissolution was carried out at 60° C. for 1 hour under stirring. Then, the solution was filtered with a 80 mesh nylon filter fabric.

The resulting solution was divided into two, and one of them was subjected to high-speed centrifugal separation at 8000 rpm for 10 minutes and viscosity was measured.

During the centrifugal separation, no sedimentation was observed. The results of measurement of viscosity were as follows.

| Item | Without centrifugal separation | With centrifugal separation |
|---|---|---|
| Heating residue % | 19.1 | 18.4 |
| Conditions of viscosity measurement | | |
| 5 rpm | 42.12 cps | 39.36 cps |
| 10 rmp | 34.92 cps | |
| 20 rmp | | 28.68 cps |

It can be seen from the above data that when the colorant precursor was subjected to ion exchanging at the final step, a colorant with less thixotropy was obtained. Furthermore, it was illustrated that a colorant with far less thixotropy was obtained by further carrying out the centrifugal separation after the ion exchanging.

COMPARATIVE EXAMPLE 2

Effects of Purification of Colorant Precursor

The necessity of the final step in Example 8 will be shown by comparative example. The measurement of viscosity was carried out by following the same procedures as in Example 8, except that PK-208 was not added. The results were as follows.

| Item | Without centrifugal separation | With centrifugal separation |
|---|---|---|
| Heating residue % | 18.9 | 17.7 |
| Conditions of viscosity measurement | | |
| 1 rpm | 553.2 cps | 501.6 cps |
| 2.5 rmp | 239.0 cps | 234 cps |

This comparative example and Example 8 illustrate how necessary the ion exchanging step as the final step is.

According to the production method of the present invention, inherent color characteristics of coloring matter substances can be brought out to capacity in colorants used for multiple-purpose. As a result, it has become possible to provide colorants which can exhibit excellent color development, even in a small amount.

Therefore, the colorants produced by the method of the present invention can be utilized not only for paints and inks, but also for parts, toners, inks for IT equipment such as color filters, color copiers, color printers, and for colorants with nanometer size to be developed in the future. Furthermore, the colorants of the present invention have a merit of less thixotropy.

What is claimed is:

1. A method for producing a colorant comprising:

contacting a dispersion of a powdery coloring matter substance in deionized water with an anion exchange resin and/or a cation exchange resin to subject the dispersion to ion exchanging until an electrical conductivity of the dispersion reaches 25 µS/cm or lower, thereby obtaining a purified coloring matter substance;

contacting with an anion exchange resin and/or a cation exchange resin an aqueous solution or organic solvent solution of a binder resin prepared so that a carboxyl group concentration or a sum of a carboxyl group concentration and a hydroxyl group concentration is 0.001 mol/ml or higher, to obtain a purified binder resin solution;

kneading the purified coloring matter substance and the purified binder resin solution to obtain a liquid colorant precursor; and contacting the liquid colorant precursor with an anion exchange resin and/or a cation exchange resin.

2. The method according to claim 1, further comprising:

subjecting the liquid colorant precursor to an ultra-high speed centrifugal separation at 5000-15000 rpm after the contacting with the anion exchange resin and/or the cation exchange resin.

3. A method according to claim 1, wherein the binder resin is a copolymer of at least one polymerizable monomer containing a carboxyl group and at least one polymerizable monomer containing neither carboxyl group nor hydroxyl group, a copolymer of at least one polymerizable monomer containing a carboxyl group, at least one polymerizable monomer containing a hydroxyl group and at least one polymerizable monomer containing neither carboxyl group nor hydroxyl group, or a mixture thereof.

* * * * *